(12) United States Patent
Shioya et al.

(10) Patent No.: US 6,840,128 B1
(45) Date of Patent: Jan. 11, 2005

(54) ENERGY ABSORBING TYPE STEERING DEVICE, AND METHOD AND DEVICE FOR ASSEMBLING THE STEERING DEVICE

(75) Inventors: Shigemi Shioya, Toyota (JP); Sadato Kita, Toyota (JP); Takashi Shimada, Toyota (JP); Seiji Sano, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 61 days.

(21) Appl. No.: 10/069,398

(22) PCT Filed: Jul. 28, 2000

(86) PCT No.: PCT/JP00/05137

§ 371 (c)(1),
(2), (4) Date: Apr. 10, 2002

(87) PCT Pub. No.: WO01/15958

PCT Pub. Date: Mar. 8, 2001

(30) Foreign Application Priority Data

Aug. 26, 1999  (JP) ............................................ 11/239399
May 1, 2000    (JP) ................................... PCT/JP00/02922

(51) Int. Cl.⁷ ............................................... B62D 1/16
(52) U.S. Cl. ........................................ 74/492; 280/777
(58) Field of Search .......................... 74/492; 280/777; 464/162, 182, 183; 403/274, 278, 359.1, 359.5, 359.6; 29/525

(56) References Cited

U.S. PATENT DOCUMENTS

| | | | |
|---|---|---|---|
| 3,665,778 A | * 5/1972 | Bohan et al. ................... 74/492 |
| 4,976,572 A | * 12/1990 | Habegger .................... 409/132 |
| 5,375,881 A | * 12/1994 | Lewis .......................... 74/492 |
| 5,664,806 A | 9/1997 | Vortmeyer et al. ........... 280/777 |
| 5,674,026 A | * 10/1997 | Ishibashi et al. .......... 403/359.5 |
| 5,709,605 A | * 1/1998 | Riefe et al. .................... 464/83 |
| 6,368,225 B1 | * 4/2002 | Breese et al. ................ 464/183 |

FOREIGN PATENT DOCUMENTS

| | | |
|---|---|---|
| DE | 40 17 995 | 12/1990 |
| FR | 1 597 341 | 7/1970 |
| GB | 1 156 423 | 6/1969 |
| GB | 2-234 208 | 1/1991 |
| JP | 49-145326 | 4/1973 |
| JP | 56-6669 | 6/1979 |
| JP | 56-8755 | 1/1981 |
| JP | 59-092255 | 5/1984 |
| JP | 3-5676 | 1/1991 |
| JP | 3-10964 | 1/1991 |
| JP | 3-10965 | 1/1991 |
| JP | 8-20348 | 1/1996 |
| JP | 9-2293 | 1/1997 |

* cited by examiner

Primary Examiner—David A. Bucci
Assistant Examiner—Timothy McAnulty
(74) Attorney, Agent, or Firm—Kenyon & Kenyon

(57) ABSTRACT

Energy absorbing steering devices may include an outer cylindrical member (OU) that is press-fited around an inner shaft member (IN). The outer shape of the inner shaft member and the inner shape of the outer cylindrical member have a circular cross-section and the diameter of the inner shape of the outer cylinder member is larger than the diameter of the outer shape of the inner shaft member. A plurality of fine members (W) is disposed along the axial direction between the circular cross-sectional outer shape and the circular cross-sectional inner shape in order to provide a clearance (G) between the inner shaft member and the outer cylindrical member. The arrangement of the fine members may be modified in order to adjust the rigidity of relative movement along the axial direction of the outer cylindrical member and the inner shaft member.

26 Claims, 17 Drawing Sheets

(A)

A1

(B)

B1

(C)

C1
W1 W2
C2

(D)

D1
L1 L2

(E)

E1  E1

(F)

F1  F1

ENERGY ABSORBING TYPE STEERING DEVICE, AND METHOD AND DEVICE FOR ASSEMBLING THE STEERING DEVICE

BACKGROUND OF THE INVENTION

1. Field of the Invention

The present invention relates to techniques for readily producing steering devices having uniform energy absorption performance. Herein, 'uniform' means that variations (in energy absorption performance) from product to product are small.

2. Description of the Related Art

Known energy absorbing type steering devices include a cylindrical steering tube (often referred to as a column) that surrounds a steering shaft. The steering tube is formed by fitting an inner tube into an outer tube. If energy is applied to the steering shaft, the tubes become more deeply fitted in order to absorb the energy. Another known absorbing type steering device includes a steering shaft. The steering shaft is formed by fitting an inner shaft into an outer shaft. The shafts become more deeply fitted when energy is absorbed. In yet another known energy absorbing type steering device, a steering tube is attached to a vehicle body so as to be axially displaceable. In response to energy being applied to the steering shaft, the steering tube is displaced relative to the vehicle body in order to absorb the energy.

All the above-described energy absorbing type steering devices absorb energy applied to the steering shaft by allowing the inner shaft amber, which is fitted within the outer cylindrical member, to axially displace relative to the outer cylindrical member.

In a steering tube formed from an inner tube and an outer tube, the outer tube serves as an outer cylindrical member and the inner tube serves as an inner shaft member. In a steering shaft formed from an inner shaft and an outer shaft, the outer shaft serves as an outer cylindrical member and the inner shaft serves as an inner shaft member. In a structure in which a displaceable steering tube is attached to a vehicle body, an outer cylindrical member secured to a bracket that is affixed to the vehicle body serves as an outer cylindrical member. In this case, the steering tube serves as an inner shaft member.

During the manufacture of such energy absorbing type steering devices, variations in energy absorption performance from product to product within the same lot must be very small.

Japanese Unexamined Patent Publication No. 56-8755 and Japanese Unexamined utility Model Publication No. 56-6669 disclose techniques that address the above-described requirement. These references describe an energy absorption steering device, in which an inner shaft is pressed into an outer shaft and a fine member, such as a piano wire, is interleaved between the shafts, thereby minimizing variations in energy absorption performance from product to product.

In a steering shaft, the rigidity of outer and inner shafts should not be too great along the axial direction in order to provide the required energy absorption performance; however, the rigidity thereof should be sufficiently great in the rotating direction in order to prevent the shafts from rotating relative to each other. In order to satisfy these requirements, the above-described prior art steering devices ensure satisfactory transmission of torque by pressing an inner shaft having an oval cross section into an outer shaft having inner shape whose cross section is similar to the shape of the inner shaft. These prior art steering devices dispose a single piano wire between the shafts in order to prevent the axial rigidity from varying between products.

In the above-described prior art steering devices, the oval cross section of the shaft ensures the transmission of the required torque. However, the inner shaft and the outer shaft contact at least at one point in the cross section. Therefore, energy absorption performance is directly affected by differences in the finish of the outer surface of inner shaft and the inner surface of outer shaft and by the dimensional tolerances of these components. Thus, realization of uniform energy absorption performance is hindered.

A steering tube made of an inner tube and an outer tube also has the same problem. Differences in the finish of the outer surface of inner tube and the inner surface of outer tube, and the dimensional tolerances of the components, directly cause variations in energy absorption performance and impede uniform energy absorption performance.

In a structure in which a displaceable steering tube is attached to a vehicle body, direct contact of an outer cylindrical member that is fixed to the vehicle body via a bracket, and the steering tube results in large variations in energy absorption performance. In order to achieve uniform energy absorption performance, as shown in Japanese Unexamined Patent Publication No. 8-20341, a cylindrical spacer made of a rigid synthetic resin is interleaved between the steering tube and the outer cylindrical member. Thus, a special spacer must be provided to impart uniform performance.

Accordingly, it is an object of the present invention to realize techniques that significantly decrease the effect of differences in the tolerances of components and variations in the finishes thereof on energy absorbing performance as compared to prior art techniques, and more specifically, to realize techniques for setting the energy absorption performance of each product at a predetermined constant level, even if the tolerances of the components and variations in the finishes thereof differ between it products. It is another object of the present invention to provide such structures at a relatively low cost.

DISCLOSURE OF THE INVENTION

Energy absorbing type steering devices according to the present invention are characterized in that an inner shaft member is press-fitted into an outer cylindrical member, the inner shaft member having a circular cross-sectional outer shape and the outer cylindrical member having a circular cross-sectional inner shape that is larger in diameter than the inner shaft member; and, a plurality of fine members is disposed between the circular cross-sectional outer shape and the circular cross-sectional inner shape such that the fine members extend along the axial direction of the members.

According the above description, pressing the inner shaft member into the outer cylindrical member also means pressing the outer cylindrical member around the inner shaft member. Both pressing operations are equivalent and generate the same result.

In the steering devices of the present invention, because a plurality of fine members is disposed between the inner shaft member and the outer cylindrical member, the dimensional tolerances of the inner shaft member and outer cylindrical member and variations in the surface conditions of the members have little effect on energy absorption performance and thus, a robust technique is achieved.

By experimentation, the inventors confirmed that by interleaving a plurality of fine members between the inner shaft member and the outer cylindrical member, both of which have circular cross-sections and thus can easily rotate relative to each other, the inner shaft member can be press-fitted within the outer cylindrical member rigidly in the rotating direction and less rigidly along the axial direction so that appropriate energy absorption performance is ensured. A single fine member disposed between the shaft member and the cylindrical member does not provide the same results as a plurality of fine members. That is, pressing the circular cross-sectional inner shaft member into the circular cross-sectional outer cylindrical member with a single fine member interleaved therebetween, while maintaining the appropriate rigidity in the axial direction, decreases rigidity in the rotating direction. Thus, sufficient torque transmission is not provided. In order to overcome this problem, prior art cylinders and shafts have utilized an oval cross-sectional shape, as shown in Japanese Unexamined Patent Publication No. 56-6755 and Japanese Unexamined Utility Model Publication No 56-6669.

Energy absorbing type steering devices according to the present invention provide energy absorption performance that does not vary from device to device. In addition, the inner shaft member and the outer cylindrical member of each steering device are fitted together rigidly in the rotating direction and less rigidly in the axial direction to an appropriate degree. Further, the steering device is manufactured from circular cross-sectional members and fine members at a relatively low cost.

By applying the present invention to a steering shaft, an inner shaft can be press-fitted within an outer shaft in a manner that reliably ensures transmission of torque from one shaft to, the other shaft. Therefore, rotational slippage does not occur. Moreover, by applying the invention to a steering column, the inter tube and outer tube are prevented from rotating relative to each other, which would hinder subsequent assembly steps. In the steering device according to the present invention is utilized between an outer cylindrical member, which is secured to a bracket that is affixed to a vehicle body, and a steering tube, the fitted together steering tube and outer cylindrical member are prevented from rotating relative to each other, which would make it difficult to perform subsequent assembly steps.

In the axial direction of an energy absorbing type steering device, each fine member is preferably longer than or equal to a length that ensures a clearance between the inner shaft member and the outer cylindrical member when the steering device is absorbing energy, which occurs when the inner shaft member is being pressed more deeply into the outer cylindrical member.

When this requirement is satisfied, uniform energy absorption performance, or energy absorption, is achieved when the inner shaft member axially displaces relative to the outer cylindrical member.

In addition, the difference in Vickers hardness between the inner shaft member and each fine member or between the outer cylindrical member and each fine member is preferably at least 200. It does not matter whether the vickers hardness of fine member is greater or less than the inner shaft member and the outer cylindrical member.

This requirement ensures plastic deformation of the inner shaft member and outer cylindrical member or plastic deformation of the fine members when the inner shaft member is press-fitted into the outer cylindrical member. Accordingly, uniform energy absorption performance is ensured regardless of the manufacturing tolerances of the members.

The positions of fine members are preferably selected in accordance with the pressing load that is required to press-fit the inner shaft member within the outer cylindrical member.

For example, when four fine members are disposed at regular intervals (i.e., at ninety-degree intervals about the center of the inner shaft member), the inner shaft member is fitted into the outer cylindrical member so as to ensure high axial rigidity, on the other hand, when two pairs of spaced apart fine members are disposed such that the angle about the center of the inner shaft member is divided, e.g., into 60 degrees, 120 degrees, 60 degrees, and 120 degrees, the inner shaft member is fitted within the outer shaft member so that low axial rigidity is ensured.

That is, by changing the circumferential arrangement of the fine members, steering devices having different energy absorption performances can be produced using the same members. Accordingly, energy absorbing type steering devices can be produced by changing the circumferential arrangement of the fine members in accordance with the pressing load that is required to press-fit the inner shaft member into the outer cylindrical member.

Further, the fine members preferably are fixedly coupled to an end face of the inner shaft member or the outer cylindrical member in order to prevent movement of the fine members in the axial direction.

When this requirement is satisfied, the inner shaft member is securely press-fitted within the outer cylindrical member with the fine members disposed between the members. Also, when energy is applied to the steering device and the inner shaft member becomes more deeply fitted into the outer cylindrical member, the fine members are maintained at a constant axial position with respect to either the inner shaft member or the outer cylindrical member, thereby ensuring uniform energy absorption performance when energy is absorbed.

A pull-in prevention means is preferably provided at a coupling portion of each fine member and the coupling portion is attached to the end face of the inner shaft member or the outer cylindrical member. For example, the pull-in prevention means may include a loop in the fine member that prevents the coupling portion from being pulled into the clearance between the inner shaft member and the outer cylindrical member.

Because the pull-in prevention means prevents the coupling portion from being pulled into the clearance, energy absorption performance becomes substantially uniform.

The present invention also provides innovative methods for assembling energy absorbing type steering devices. Methods for assembling energy absorbing type steering devices, in which an inner shaft member is press-fitted into an outer cylindrical member, are characterized by a step of extending a plurality of fine members in the axial direction along the outer shape of the inner shaft member or along the inner shape of the outer cylindrical member and a step of press-fitting the inner shaft member into the outer cylindrical member with the fine members disposed between the inner shaft member and the outer cylindrical member so that the fine members provide a clearance between both members.

This method facilitates assembly of steering devices having uniform energy absorption performance.

In the above-described assembling method, at least one of the inner shaft member, the outer cylindrical member, or the fine members preferably deforms beyond the respective elastic limit thereof. When one deforms past its elastic limit, or is plastically deformed, the adverse effects of dimensional tolerances of the members decrease, which provides an extremely uniform energy absorption performance.

In this method, the load that is applied to press-fit the inner shaft member into the outer tube member preferably is measured and the fine members are preferably cut when the measured load reaches a predetermined value.

Thus, by using this method, steering devices can be reliably assembled so as to have an energy absorption performance that is adjusted to a predetermined value.

In the alternative, according to this method, a predetermined length of the fine members may preferably be axially positioned along the inner shape of the outer cylindrical member and the inner shaft member may preferably be press-fitted into the outer cylindrical member while preventing the fine members from being axially drawn into the outer cylindrical member.

By using this method, the lengths of the fine members disposed between the shaft member and the cylindrical member can be accurately determined and steering devices that provide uniform energy absorption performance can be more easily assembled.

The present invention further provides innovative apparatus for assembling steering devices. The assembling apparatus includes a device that press-fits an inner shaft member into an outer cylindrical member and a fine-member supply device that supplies a plurality of fine members to the clearance between the outer shape of the inner shaft member and the inner shape of the outer cylindrical member. The fine-member supply device is disposed adjacent to the press-fitting device.

According to this apparatus, steering devices having uniform energy absorption performance are easily and efficiently assembled.

In this apparatus, the fine-member supply device preferably can be adjusted with respect to the circumferential direction of the inner shaft member and outer cylindrical member. Such an apparatus enables the production of energy absorbing type steering devices having various levels of rigidity with respect to the axial direction.

DETAILED DESCRIPTION

Figure 1:
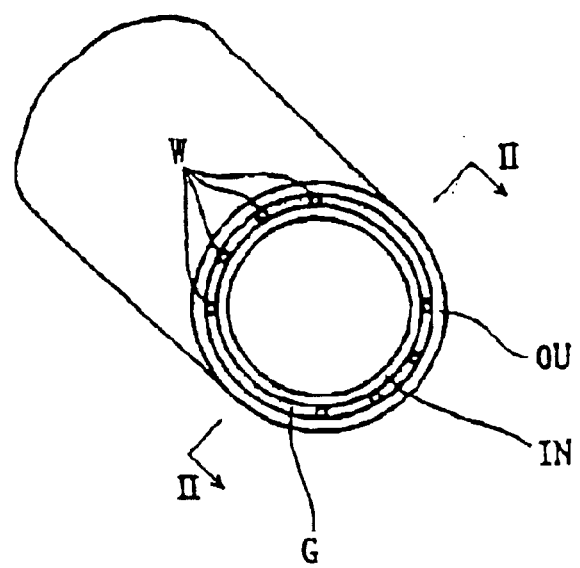
FIG. 1 schematically shows a steering tube according to one embodiment of the present invention.
Figure 2:
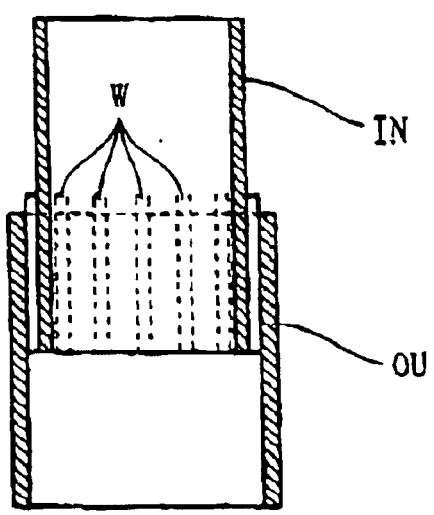
FIG. 2 is a cross-sectional view taken along line II—II shown in FIG. 1.

Embodiments according to the present invention will hereinafter be described with reference to the accompanying drawings. FIGS. 1 and 2 schematically show the positional relationship of inner tube IN fitted within outer tube OU. The outer shape of inner tube IN has a circular cross section and the inner shape of outer tube OU also has a circular cross section. The inner diameter of outer tube OU is larger than the outer diameter of inner tube IN. When both tubes are fitted together, annular-shaped gap G is defined between tubes IN and OU. A plurality of fine members W is fitted within gap G between tubes IN and OU. The outer diameter of each of fine members W, before being fitted therein, is larger than the width of gap G, which means that fine members W are squeezed within gap G. Fine members W are disposed such that outer tube OU and inner tube IN are maintained at coaxial relationship. The number of fine members is preferably greater than or equal to three. However, two bent fine members also can be utilized to maintain inner tube IN and outer tube OU at coaxial relationship.

Figure 3:
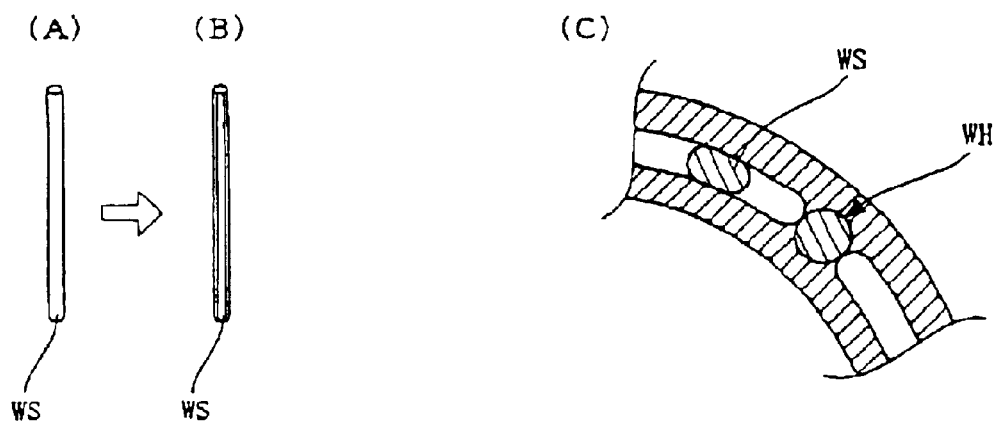
FIGS. 3(A), (B), and (C) show fine members before and after the steering tube is assembled.

Fine members W are less rigid than tubes IN and OU. Each fine member W, which has a circular cross section before being fitted into the gap as shown in FIG. 3(A), is plastically deformed when fitted therein as shown in FIG. 3(B). This will become clear by referring to WS in FIG. 3(C). In the alternative, fine members W may be more rigid than tubes IN and OU, in which case the tubes will plastically deform when receiving fine members W. This will also become clear by referring to WH in FIG. 3(C). Depressions are formed within both the portion of the outer wall of tube IN and the portion of the inner wall of tube OU that contact a common fine member. Moreover, the portions adjacent to the depressions are distended.

Tubes IN and OU and fine members W may all have equal rigidity, in which case all these components will plastically deform when fitted together.

Figure 4:
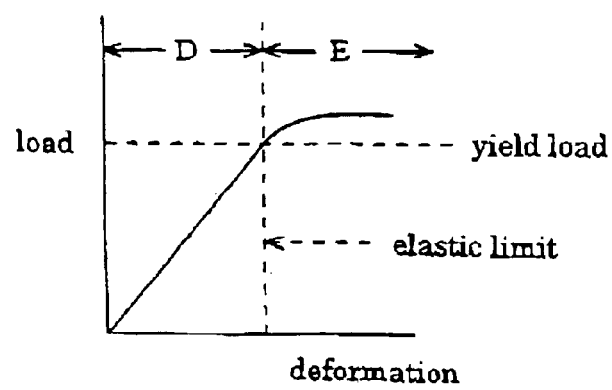
FIG. 4 is a graph showing a relationship between material deformation and load.

FIG. 4 shows the relationship between the load applied to each component and its deformation. When deformed beyond its elastic limit, the load becomes constant regardless of the amount of deformation. In the present invention, because at least one of tube IN, tube OU, or fine member W is deformed beyond its elastic limit, the components are fitted together using a substantially constant load. In FIG. 4, area D indicates the range of elastic deformation. By fitting the components together within the elastic range, the fitting load varies. In the present invention, by deforming at least one of the components within the plastic deformation level indicated by area E, the dimensional tolerances of the components are prevented from varying the fitting load.

Figure 5:
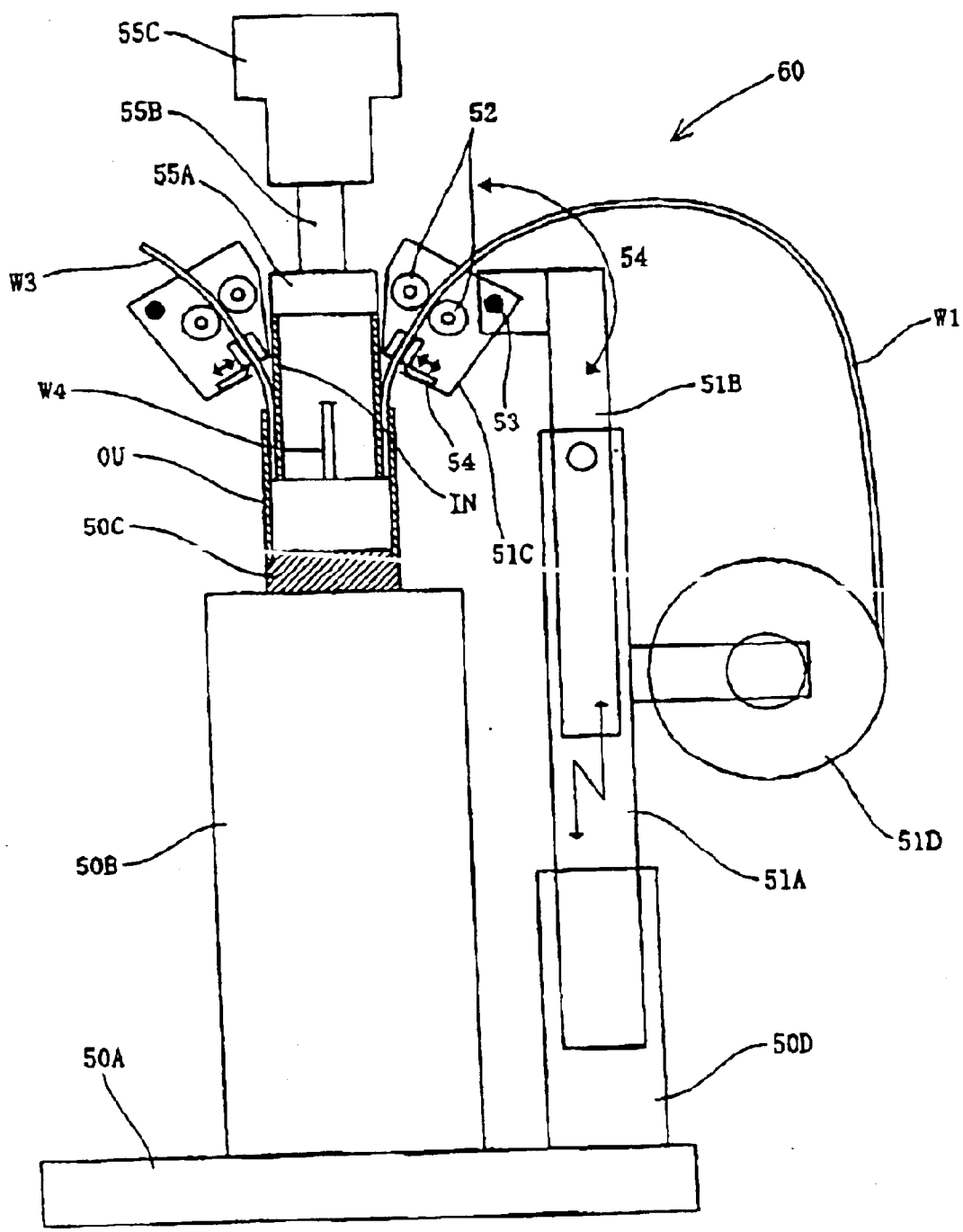
FIG. 5 shows an assembling apparatus according to a first embodiment.

FIG. 5 shows an assembling apparatus according to the first embodiment of the present invention. First column 50B is fixed to base 50A. Jig 50C vertically positions outer tube OU and is disposed on the upper end of first column 50B. Cylinder 55C is fixed above jig 50C. Cylinder 55C is fixed to first column 50B by a member, which is not shown. Another jig 55A vertically positions inner tube IN and is disposed at the lower end of piston 55B of cylinder 55C. Outer tube OU and inner tube IN are coaxially positioned by respective jigs 50C, 55A. When jig 55 is lowered by cylinder 55C, inner tube by is pressed into outer tube OU. In other words, outer tube OU is press-fitted around inner tube IN. In this specification, there is no difference in meaning between these two expressions Four fine member supply devices 60 are disposed near first column 50B. The fine member supply devices are all identical in structure. Therefore, the following description will be focused on only one.

Fine member supply device 60 includes second column 50D, which is fixed to base 50A. Arms 51A, 51B are mounted on second column 50D via cylinders, which are not shown, so as to be selectively moved upward or downward. Fine member W is wound around drum 51D, which faces side arm 55A and freely rotates. Three fine members W1, W3, W4 are shown in the drawing and fine member W2 is blocked from view. Hereinafter, reference numerals will be omitted for the description of the common features of fine members W1, W2, W3, W4.

Wrist 51C is disposed at the upper end of arm 51B and can rotate about pin 53. A pair of fine member supply rollers 52 is rotatably mounted on wrist 51C. The pair of rollers 52 is rotated by a motor, which is not shown. Cutter 54 for cutting fine member W is attached to the lower end of wrist 51C.

The assembling apparatus includes a device that presses outer tube OU around inner tube IN. The assembling apparatus also includes a fine member supply device that supplies fine members W into a clearance defined between the outer shape of inner tube IN and the inner shape of outer tube OU and the fine member supply device is adjacent to the pressing device.

The operation of the assembling apparatus will now be described. First, outer tube OU is set on jig 50C. Then, fine member supply rollers 52 rotate a predetermined number of times so as to feed a predetermined length of fine member W. The fed fine member axially extends a predetermined length along the inner face of outer tube OU. At this time, four fine members W are circumferentially arranged in such a manner as to be equally spaced apart from each other. In this state, each of fine member supply rollers 52 is prevented from rotating. Subsequently, inner tube IN is held by jig 55A. Thereafter, cylinder 55C is actuated in order to press down jig 55A. As a result, inner tube IN is pressed into outer tube OU and four fine members W are axially disposed the predetermined distance along the inner face of outer tube OU. At this time, inner tube IN does not directly contact outer tube OU. While inner tube IN is being pressed into outer tube OU, each of fine member supply rollers 52 is prohibited from rotating so as to prevent fine members W from being further pulled into outer tube OU.

Figure 6:
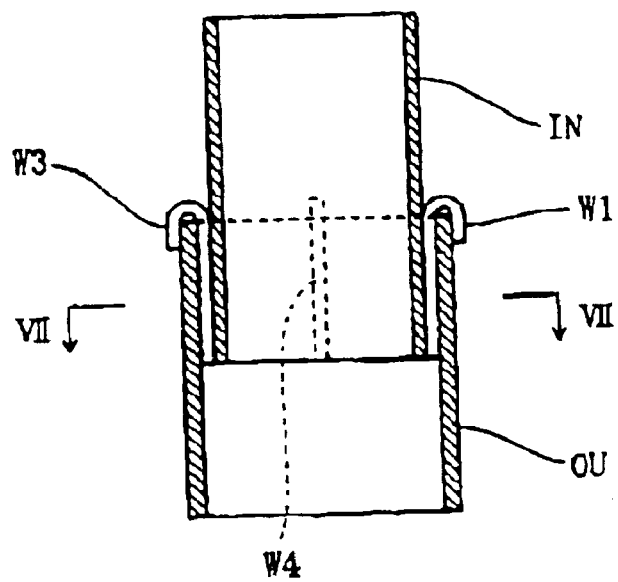
FIG. 6 is a cross-sectional view of a fitted portion of a steering tube assembled by the apparatus of FIG. 5.
Figure 7:
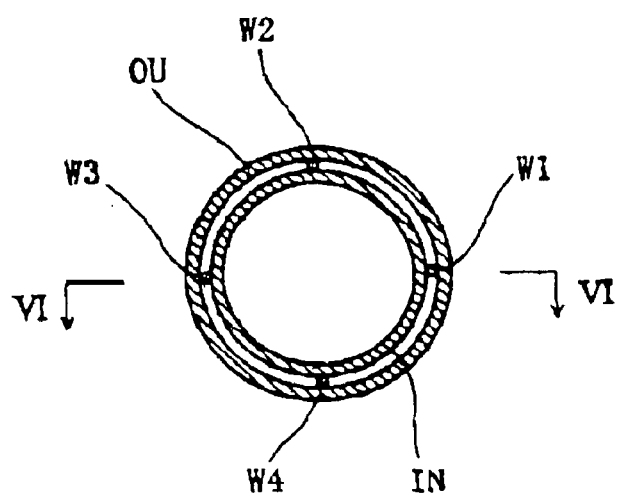
FIG. 7 is a cross-sectional view taken along line VII—VII in FIG. 6.

After inner tube IN is pressed into outer tube OU, arms 51A, 51B are lowered in order to bend down fine member W, which extends from the upper face of outer tube OU. At this time, wrist 51C rotates about pin 53. Cutter 54 cuts bent fine member W at a line that is spaced by a predetermined length from the face of the upper end of outer tube OU. Then, fine member W, which extends from outer tube OU, is further bent along outer tube OU using a tool. This operation will become clear by referring to FIG. 6.

In a steering tube assembled in such a manner, outer tube OU is press-fitted around inner tube IN, four fine members W are disposed a predetermined length along the inner shape of outer tube OU and the four fine members W are prohibited from being axially pulled further into outer tube OU. Accordingly, fine member W extends between inner tube IN and outer tube OU and has been cut at a predetermined length. This feature contributes to ensuring uniform energy absorption performance. Four fine members W separate inner tube IN and outer tube OU from each other (i.e., clearance G exists in the space in which there is no fine member W), thereby preventing inner tube IN from directly contacting outer tube OU. This feature also contributes to ensuring uniform energy absorption performance. After assembling the steering tube, fine member W remains bent and fixed to the upper end face of outer tube OU. If energy is applied to both tubes IN and OU so that inner tube IN is pressed more deeply into outer tube OU, fine members W will reliably guide inner tube IN during the pressing operation while remaining fixedly coupled to the upper end face of outer tube OU. In addition, because fine members w are fixedly coupled to the upper end face of outer tube OU and are prohibited from moving in the axial direction, the energy absorption performance is uniform when energy is being absorbed. Further, by using a sufficient length of fine member W, tubes IN and OU are maintained in a parallel relationship when inner tube IN is pressed deeply into the outer tube OU. This sufficient length also prevents both tubes from bending and thus contacting each other. This feature prevents inner tube IN from directly contacting outer tube OU when energy is absorbed. The axial length of fine member W is predetermined in order to prevent inner tube IN from directly contacting outer tube OU when inner tube IN is further pressed into outer tube OU in order to absorb energy. Accordingly, the energy absorption performance is uniform when energy is absorbed. If three or more fine members are used, the tubes can be maintained in a parallel relationship. Therefore, any number of fine members, not less than three, may be used. In addition, two bent fine members can be utilized to fit together both tubes while providing a clearance between the tubes.

Fine member W of the above-described first embodiment is a steel wire that is more rigid than the tubes. The steel wire is made rigid by being processed. In the present embodiment, each tube wall that contacts the steel wire is deformed beyond its elastic limit. One tube is pressed into the other tube within the range of plastic deformation. Therefore, even if there are variations in the sizes of tubes IN and OU, the variations impart little adverse effect on the assembling load.

The steering tube according to the present embodiment and the method for assembling steering tubes provide uniform energy absorption performance. Also, the apparatus for assembling steering tubes enables efficient assembling of steering tubes having uniform energy absorption performance.

As mentioned above, the present invention is preferably utilized at a position between the outer tube and the inner tube. However, the present invention also may be utilized at a position between an outer shaft and an inner shaft, in which case the inner shaft may be solid or IBM tubular. The present invention can also be utilized at a position between an outer tube member of a bracket, which is affixed to a vehicle body, and a steering tube.

Figure 8:
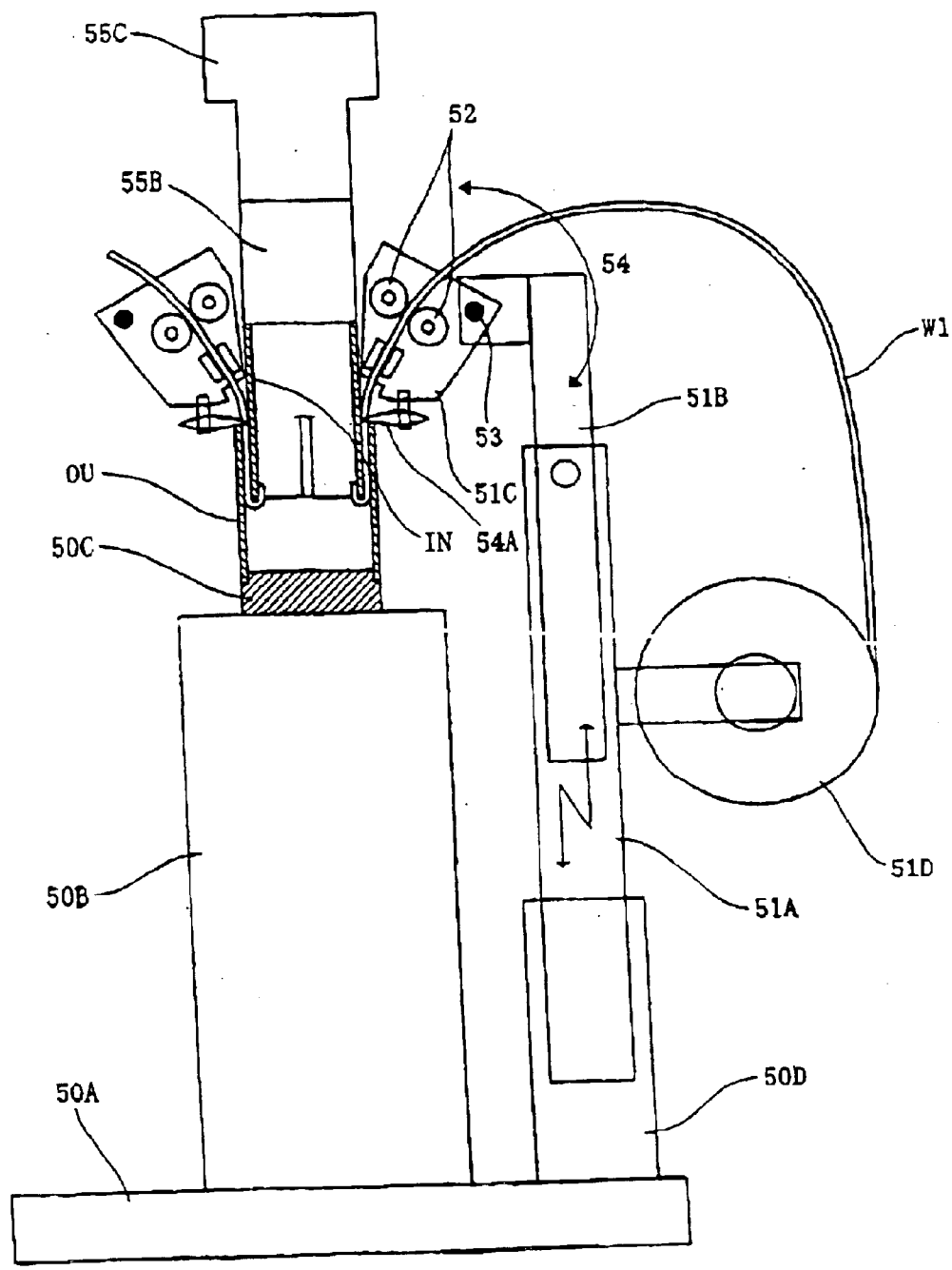
FIG. 8 shows an assembling apparatus according to a second embodiment.
Figure 9:
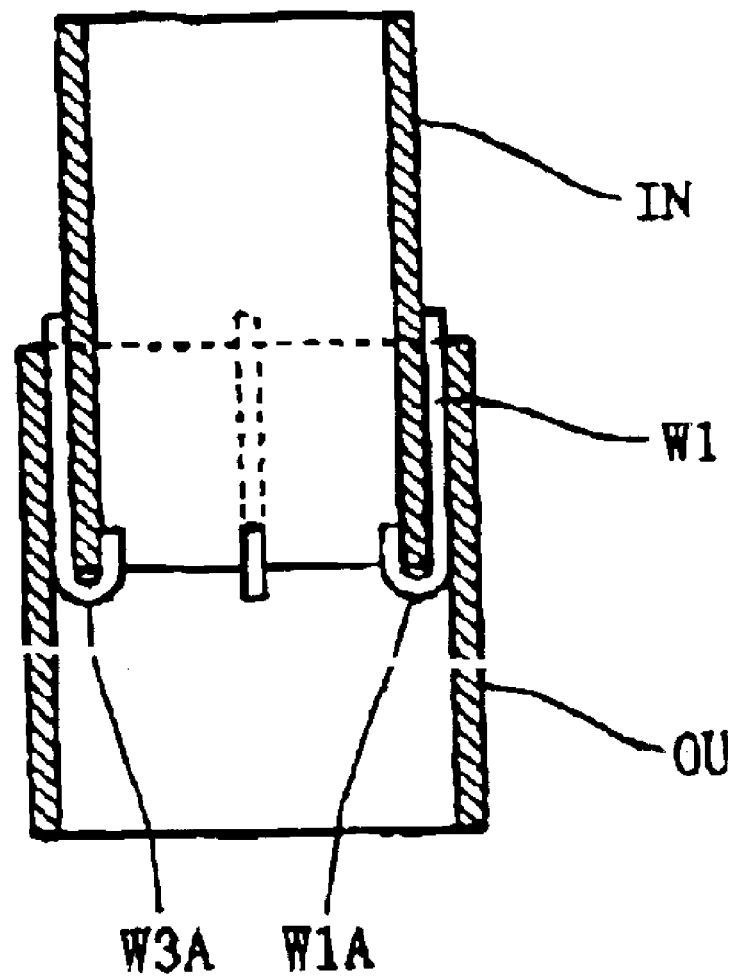
FIG. 9 is a cross-sectional view of a fitted portion of a steering tube assembled by the apparatus of FIG. 9.

FIG. 8 shows an assembling apparatus according to a second embodiment of the present invention. The main body of the device is equivalent to the main body of the device shown in FIG. 5. Thus, like elements will be denoted with the same reference numerals and will not be described in detail.

Figure 10:
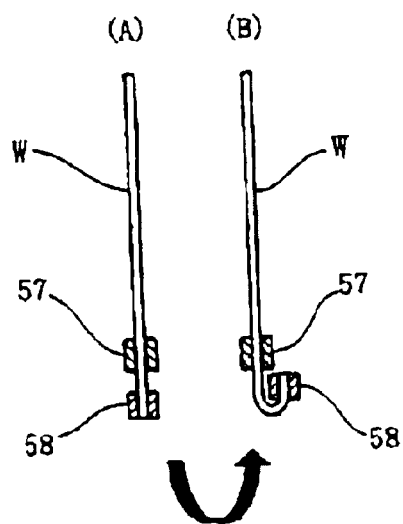
FIG. 10 shows a bending mechanism incorporated into the apparatus of FIG. 8.

In this assembling apparatus, a bending device, as shown in FIG. 10, is disposed adjacent to wrist 51C. In FIG. 10, reference numerals 58 indicate a pair of gripping pawls, which grips the ends of the fine members, while reference numerals 57 indicate another pair of gripping pawls, which grips the fine members at a position higher than gripping pawls 58. Gripping pawls 58 are selectively turned upward or downward, as shown in FIG. 10(B). Therefore, gripping pawls 58 bend the end of fine member W. Fine member W becomes rigid due to processing. Accordingly, the bent portion is rigid.

The apparatus of FIG. 8 operates as follows. Outer tube OU is first set on jig 50C. Then, each of fine member supply rollers 52 is rotated a predetermined number of times in order to feed a predetermined length of fine member W. The fed fine member is aligned with the downward path of inner tube IN. By lowering inner tube IN, portions W1A, W2A, W3A, W4A of the ends of the respective fine members are placed into positions in which the respective portions will be fixed to the lower end face of hollow inner tube IN. In the same manner as the first embodiment, four fine members W are equally spaced apart from each other around the circumference. In this state, a motor freely permits each of fine member supply rollers 52 to rotate. Subsequently, inner tube IN is set on jig 55B. Cylinder 55C is actuated to press down jig 55B. When jig 553 is pressed down, the bent ends of the four fine members W are fixedly coupled to the lower end face of lowered inner tube IN. When inner tube IN is further lowered, fine member W is further pulled from drum 51D. Inner tube IN is further pressed down into outer tube OU with four fine members W interposed therebetween. As inner tube IN is pressed more deeply into outer tube IN, more of fine member W is pulled from drum 51. Upon pressing inner tube IN to a predetermined depth, cylinder 55C is stopped. Cutter 54A then cuts fine member W on a line near the upper end face of outer tube OU.

In steering tubes assembled with this apparatus, fine member W extends the depth of insertion of inner tube IN into outer tube OU. Thus, direct contact of tubes IN and OU is reliably prevented. In addition, the lengths of inner tube IN and outer tube OU are predetermined so that tubes IN and OUT do not bend. This feature prevents both tubes from bending and contacting each other when the tubes are absorbing energy.

When inner tube IN is inserted more deeply, fine member W becomes fixedly coupled to the lower end of inner tube IN. Thus, fine member W is prevented from axially displacing with respect to inner tube IN, and as a result, the lower end of inner tube IN does not directly contact the inner face of outer tube OU. By fixedly coupling fine member W to the lower end face of inner tube IN, movement of fine member N in the axial direction is prohibited with respect to inner tube IN, thereby making the energy absorption performance of steering tubes assembled using this apparatus substantially uniform.

A number of experiments were conducted by the inventors, which show that the energy absorption performance can be made substantially uniform by using fine members W having a Vickers hardness that is at least 200 greater than the material of the tubes. This point will become clear by referring to FIG. 11.

Figure 11:
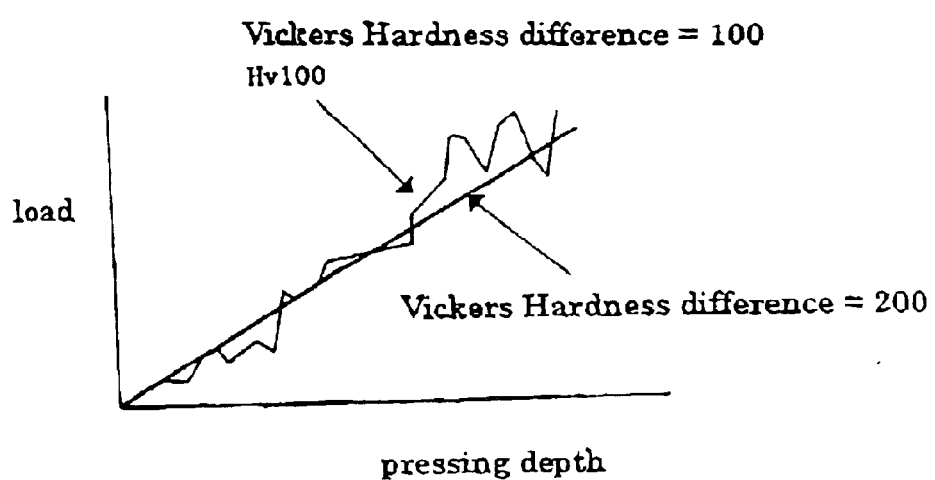
FIG. 11 is a graph showing a relationship between pressing depth and load.

In FIG. 11, the load required to press inner tube IN into outer tube OU at a constant speed is indicated by the vertical axis while the pressing depth is indicated by the horizontal axis. The straight thick solid line indicates the results of experiments using a fine member having a Vickers hardness that is 200 greater than the tubes. The bent thin line indicates the results of experiments using a fine member having a Vickers hardness that is 100 greater than the tubes. If the Vickers hardness of the fine member is 200 greater than the tubes, the pressing load linearly increases with the pressing depth. An unsatisfactory difference in Vickers hardness between the fine member and the tubes results in an irregular relationship between the pressing load and the pressing depth. The inventors found through experimentation that control of the pressing depth ensures accurate control of the pressing load as long as the difference in Vickers hardness is at least 200.

The experiments also show that a fine member made of material having a Vickers hardness that is at least 200 less than the tube member material also ensures a linear relationship between the pressing depth and the pressing load. Accordingly, when the difference in Vickers hardness between inner tube IN and fine member W, or between outer tube OU and fine member W, is at least 200, energy absorption is extremely uniform.

Figure 22:
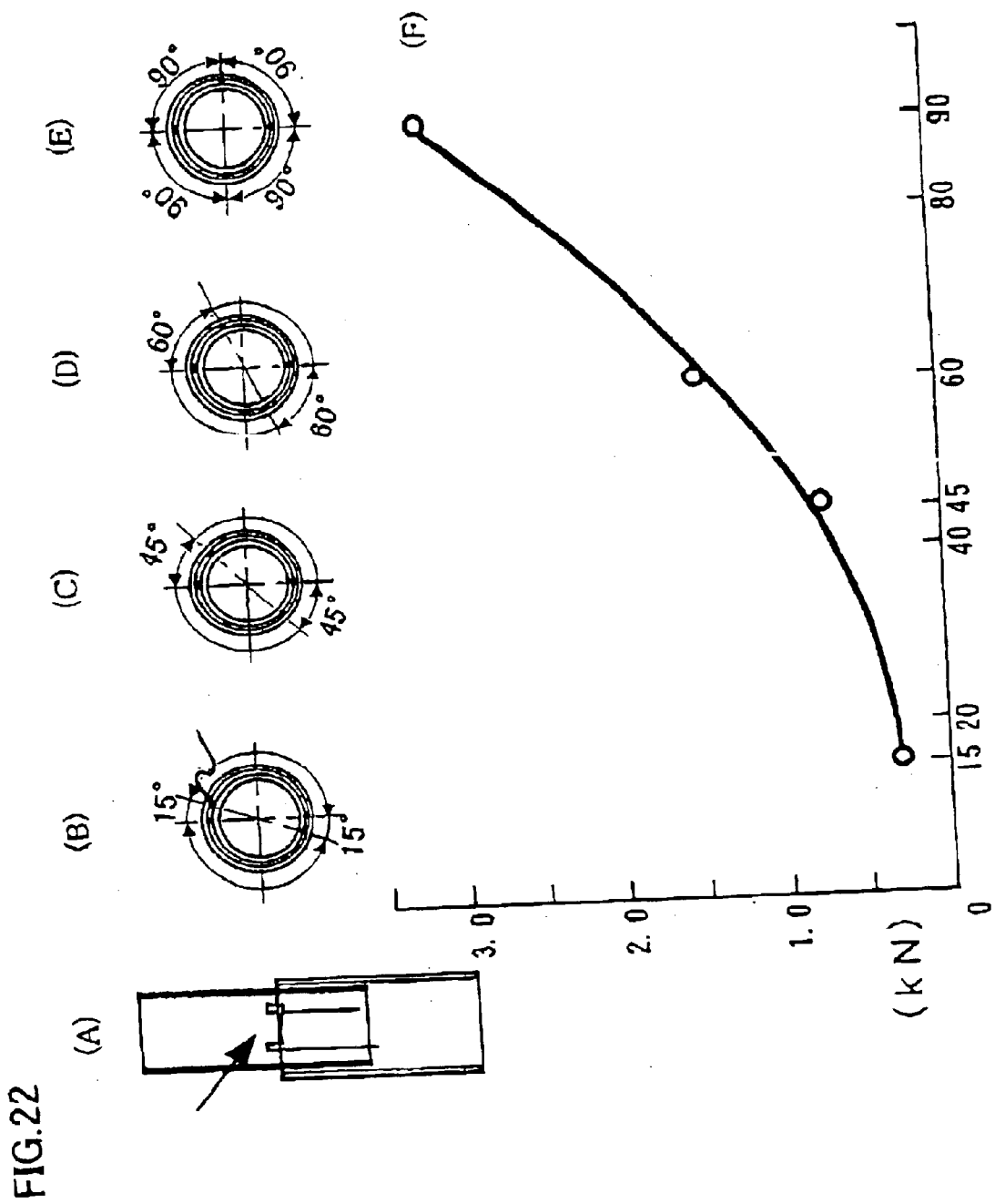
FIGS. 22(A), (B), (C), (D), (E), and (F) show the relationships between different arrangements of the fine members and axial rigidity.

The inventors conducted many other experiments that resulted in the discovery that the arrangement of fine members W has a substantial effect on the axial rigidity of the tubes. This point will become clear by referring to FIG. 22. FIG. 22(B) shows fine members W circumferentially disposed around the common center of the tubes so as to form an angle of 15°, an angle of 165°, an angle of 15°, and an angle of 165° between adjacent fine members W. Each two fine members form a pair, and the two pairs are widely spaced apart from each other in the direction of the tube diameter. In this case, both tubes tend to be easily deformed in an oval shape when one tube is pressed into the other tube. Therefore, the axial rigidity of the fitted tubes is relatively low. As shown in the graph of FIG. 22(F), the pressing force that is required to press-fit the tubes together, or the axial load that is required to displace the fitted tubes relative to each other, is indicated by the vertical axis. The angle between each two adjacent fine members is indicated by the horizontal axis. As noted above, when the angle is 15°, the axial pressing load is low.

FIG. 22(E) shows the arrangement angles of the fine members as viewed from the tube center, in which the fine members are disposed at intervals of 90°. Thus, the four fine members are equidistantly disposed around the circumference. In this case, the tubes are each subjected to change in circumferential length when one tube is pressed into the other tube. Therefore, the axial rigidity of the assembled tubes is very high. As shown in FIG. 22(F), the axial load required to displace the fitted tubes relative to each other is very large.

FIGS. 22(B) to (D) show arrangement angles that are between 15° and 90°. As the intervals between the adjacent fine members approach regular intervals, the axial load becomes larger. To the contrary, as the intervals become more irregular, the axial load becomes smaller.

This relationship enables the energy absorption properties to be changed while still using the same components. By disposing the fine members at regular intervals, the axial load of the energy absorbing type steering tube will be large. By disposing the fine members at irregular intervals, the axial load of the energy absorbing type steering tube will be small.

Figure 23:
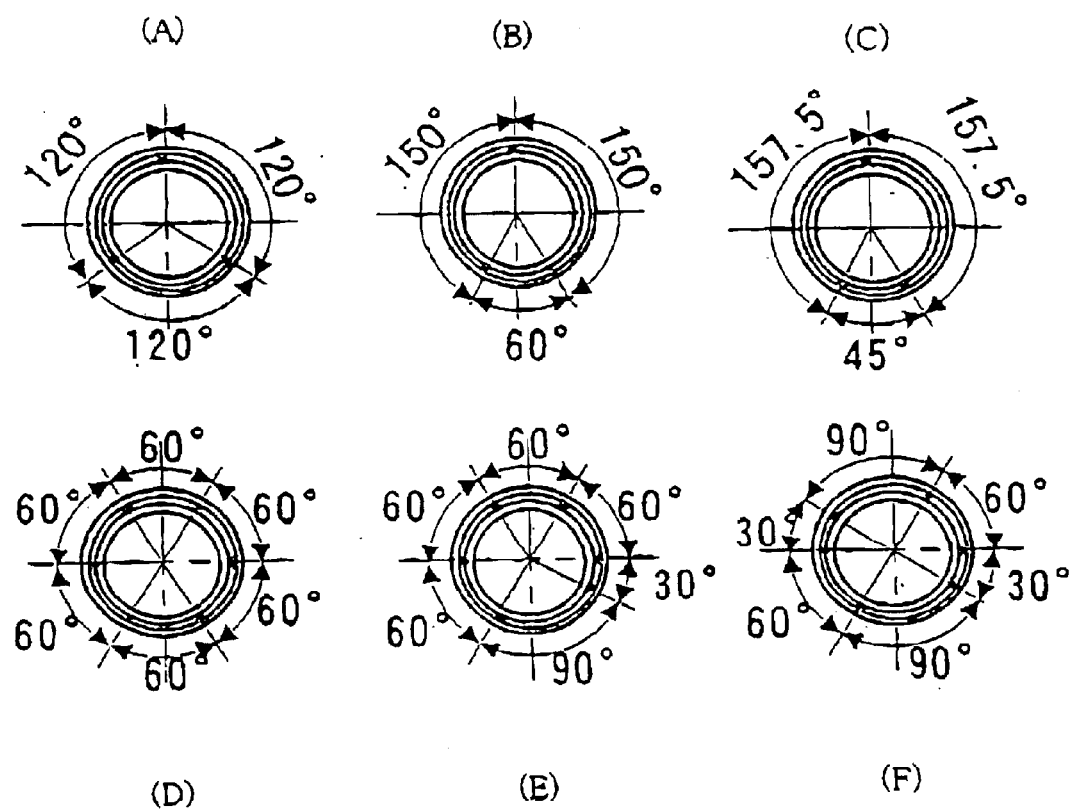
FIGS. 23(A), (B), (C), (D), (E), and (F) show examples of different arrangements of the fine members.

FIGS. 23(A) to (C) show various arrangements of three fine members. FIGS. 23(D) to (F) show various arrangements of six fine members. By selecting one of these arrangements, the axial rigidity can be modified. The arrangements shown in FIGS. 23(A) and (D) provide high rigidity while the arrangements shown in FIGS. 23(C) and (F) provide low rigidity.

The above-described second embodiment provides an example of using the present invention at the position between the outer tube and the inner tube. However, the present invention may be utilized at a position between an outer shaft and an inner shaft, in which case the inner shaft may be solid or tubular. The present invention can also be utilized at a position between an outer tube member of a bracket, which is affixed to a vehicle body, and a steering tube.

Figure 12:
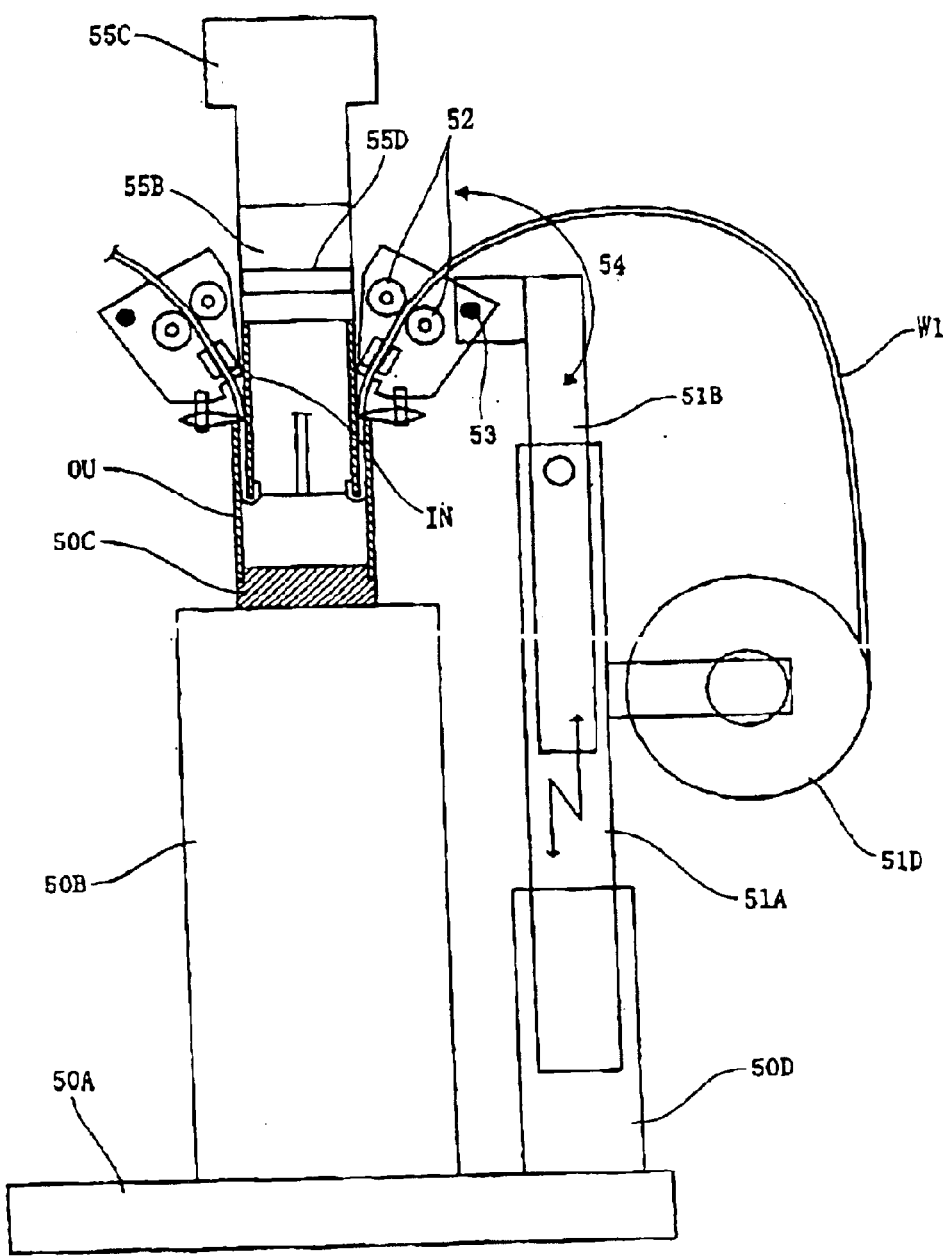
FIG. 12 shows an assembling apparatus according to a third embodiment.

FIG. 12 shows an assembling apparatus according to the third embodiment of the present invention. The assembling apparatus of the present embodiment is similar to the assembling apparatus of FIG. 8. Therefore, only different features will now be discussed. In the assembling apparatus, jig 55B includes load call 55D in order to measure the required pressing load. The assembling apparatus performs the assembly while measuring the pressing load. Fine member W is cut when the pressing load reaches a predetermined value.

Figure 13:
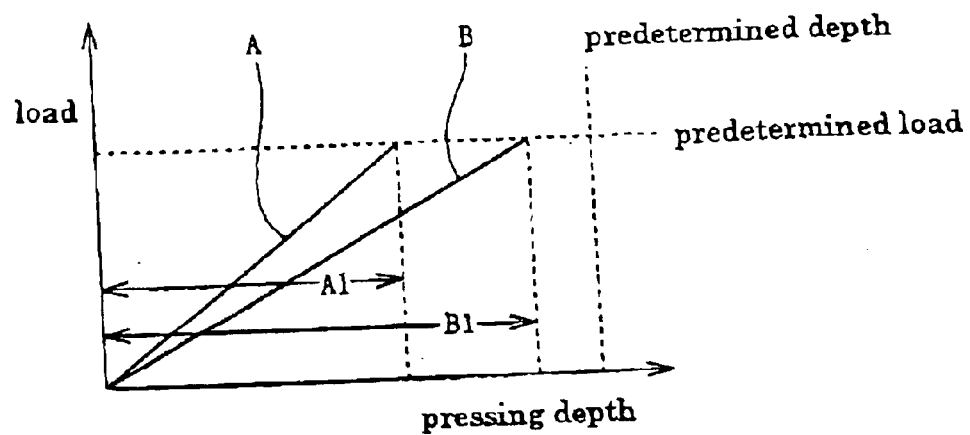
FIG. 13 is a graph showing a relationship between pressing depth and load.

FIG. 13 schematically shows the relationship between the pressing depth and the pressing load. Reference mark A indicates the relationship between the pressing depth and the pressing load for product A. Reference mark B indicates the relationship between the pressing depth and the pressing load for product B that was manufactured according to the same dimensional specification as product A. As was described above, the present invention reduces the effects of differences in dimensional tolerances of the components on the pressing load, which contributes to making the pressing load uniform. Products A and B are substantially similar to each other as compared to prior art products. However, in FIG. 13, a large difference between products A and B is shown for the purpose of illustration.

The above discussion does not mean that the dimensional tolerances of the components will not have any effect on the pressing load. According to precise measurements, the pressing load varies from product to product. The apparatus of FIG. 12 measures the pressing load using load cell 55D while continuing to press at the constant speed. The apparatus then cuts fine member W when the measured pressing load reaches a predetermined value. Thereafter, the apparatus keeps the pressing load constant when inner tube IN is further pressed. Consequently, all the products are adjusted to the predetermined pressing load. By utilizing such features in the assembling apparatus, in which one tube is pressed into the other tube while the pressing load is measured, and then fine member W is cut when the pressing load reaches the predetermined value, a batch of steering tubes can be assembled with high efficiency and differences in energy absorption performance between the products also can be minimized.

The above-described assembling apparatus includes a step of extending a plurality of fine members w along the axial direction of the outer shape of inner tube IN (see FIGS. 8 and 12) or the inner shape of outer tube IN (see FIG. 5) and a step of press-fitting outer tube OU around inner tube IN while prohibiting inner tube IN from directly contacting outer tube IN by means of fine members W, thereby assembling a batch of steering tubes having uniform energy absorption performance.

Each of the fine members employed in the illustrated embodiments is wound around the drum. However, in the present invention, pre-formed fine members may instead be disposed between inner tube IN and outer tube OU. FIGS. 14 through 21 show examples of pre-formed fine members.

Figure 14:
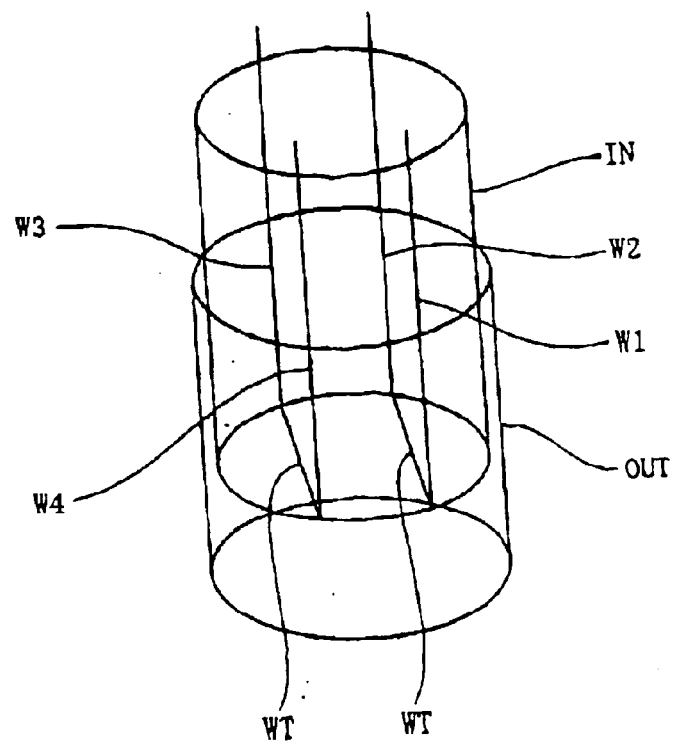
FIG. 14 shows examples of fine members.
Figure 15:
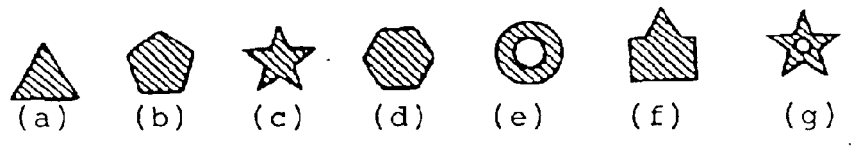
FIGS. 15(a)–15(g) show examples of the cross-section of the wire members.
Figure 16:
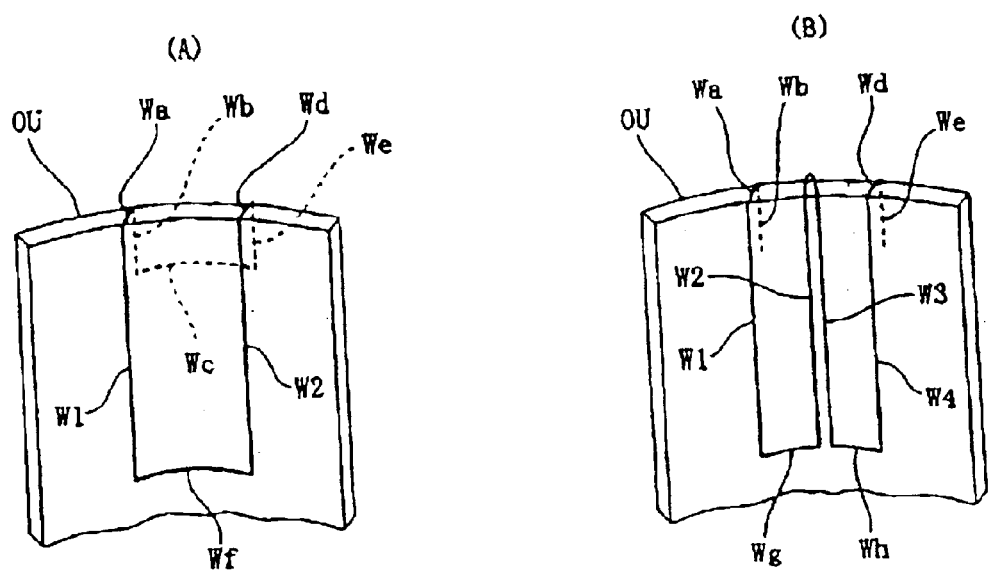
FIGS. 16(A) and (B) show two examples of the fine members.
Figure 17:
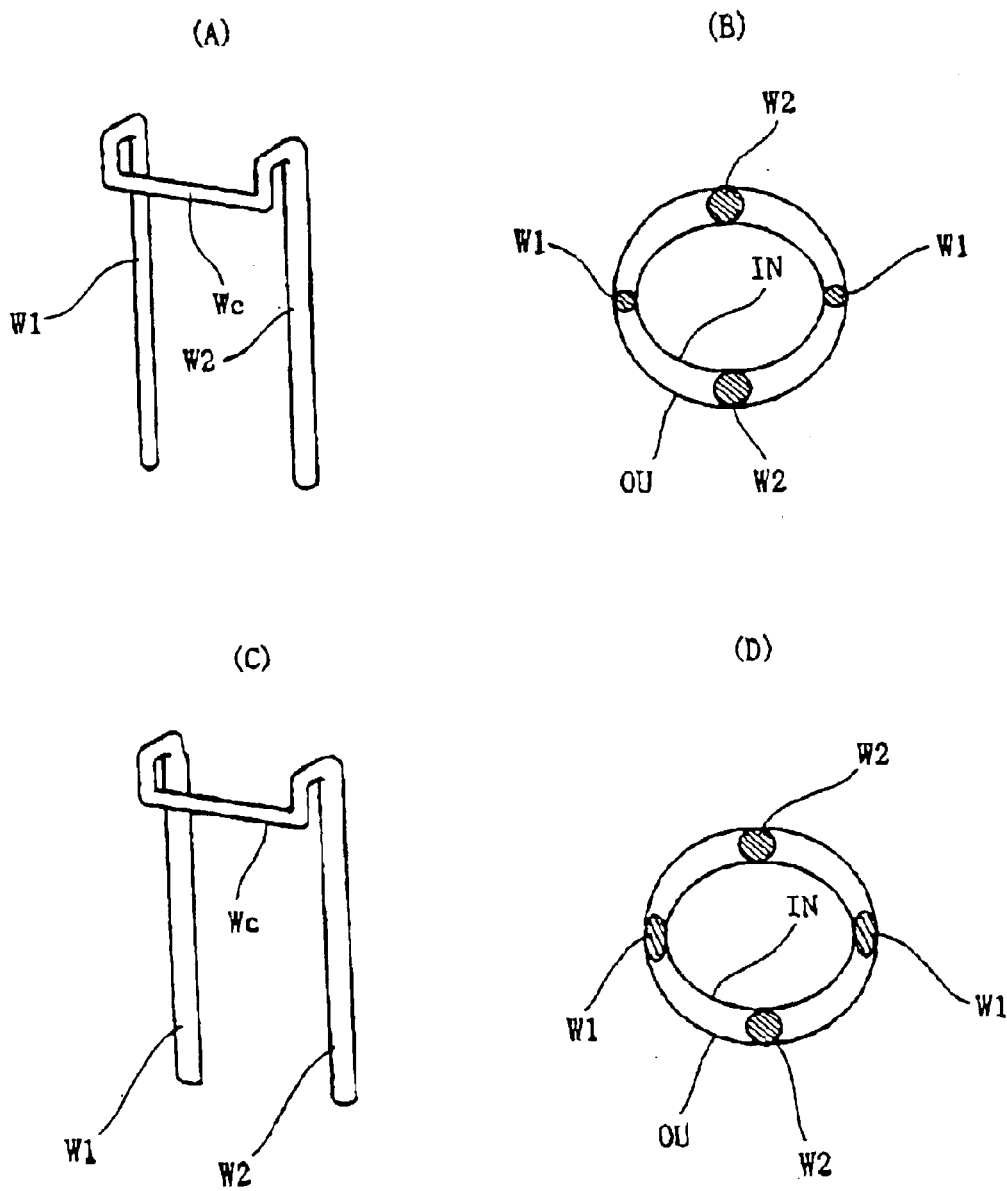
FIGS. 17(A), (B), (C), and (D) show another two examples of the fine members.
Figure 18:
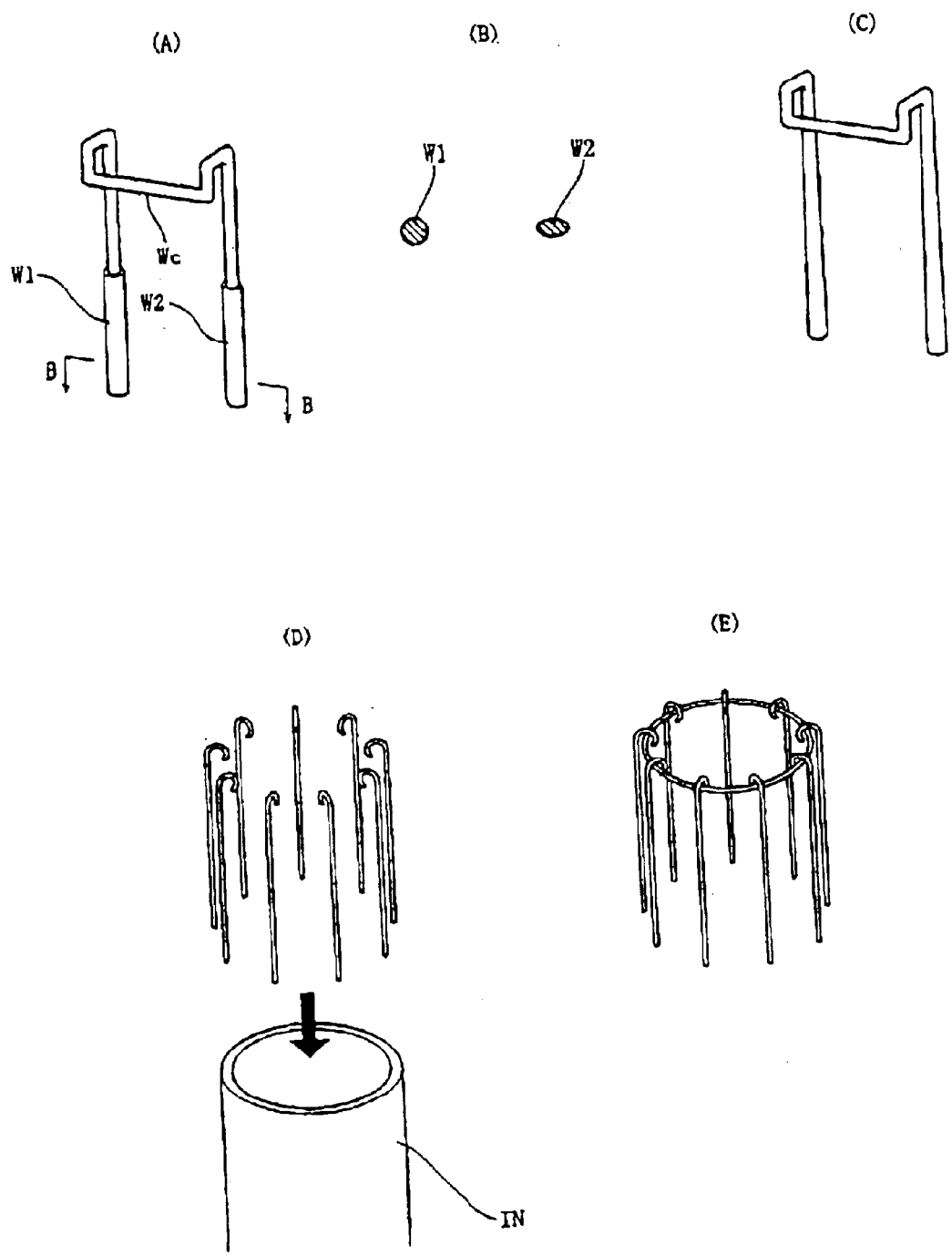
FIGS. 18(A), (B), (C), (D) and (E) show further examples of the fine members.

With reference to FIG. 14, first fine member W1, second fine member W2, and connection WT, which form a pair of fine members, are made from a single piece of material. In this case, two pairs are used. The other pair includes third fine member W3 and fourth fine member W4. Each connection WT is positioned on the inner end of inner tube IN and then inner tube IN is pressed into outer tube OU, or outer tube OU is press-fitted around inner tube OU.

The cross section of fine member W may be circular, because this shape can be inexpensively formed. However, when it is necessary to fit together the components such that the rigidity in the axial direction is low and the rigidity in the rotating direction is high, a variety of cross-sectional shapes can be used, as shown in FIGS. 15(a)–15(g). The fine member is not required to be solid, but also may be hollow.

FIG. 16(A) shows examples of fine members fixedly coupled to the end face of outer tube OU, in which fine members W1, W2 are disposed along the inner face of outer tube OU in the axial direction. Fine members W are connected together by connections Wf, Wc. Bent portions Wa, Wd are fixedly coupled to the end of outer tube OU in order to prohibit axial movement of the fine members. FIG. 16(B) shows another example of pre-formed fine members, in which fine members W1, W2, W3, W4 are formed from a single piece of material.

FIG. 17(A) shows another example of a pair of preformed fine members, in which fine members W1, W2 have different diameters. As shown in FIG. 17(B), this type of fine member is used in two pairs. Thus, inner tube IN having an oval cross-sectional outer shape may be pressed into outer tube OU having a circular cross-sectional inner shape, or inner tube IN having a circular cross-sectional outer shape may be pressed into outer tube OU having an oval cross-sectional inner shape.

FIG. 17(C) shows another example of a pair of preformed fine members, in which the cross-sectional shapes of the fine members are different from each other. Thus, a circular cross-sectional tube may be fitted into an oval cross-sectional tube, as shown in FIG. 17(D).

FIG. 18(A) shows another example of a pair of preformed fine members, in which fine members W1, W2 have different cross-sectional shapes and the cross-sectional shapes gradually change along the length of the fine member. This type of fine member may be suitably used in order to modify the energy absorption properties when energy is absorbed.

If many fine members are used, the fine members may be fixedly coupled to the tube end face one by one, as shown in FIG. 18(D). However, the fine members may instead be arranged in advance and coupled to the tube end face all at once, as shown in FIG. 18(E).

The inventors also discovered through experimentation that a coupling portion, which couples a fine member to a tube end face, may be pulled into the clearance between the tubes. This phenomenon will cause a sudden increase in the pressing load, which results in unsatisfactory energy absorption performance.

Figure 19:
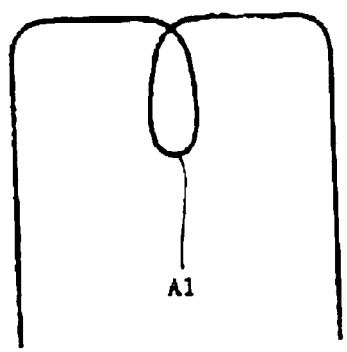
FIGS. 19(A), (B), (C), (D), (E), and (F) show further examples of fine members.
Figure 19:
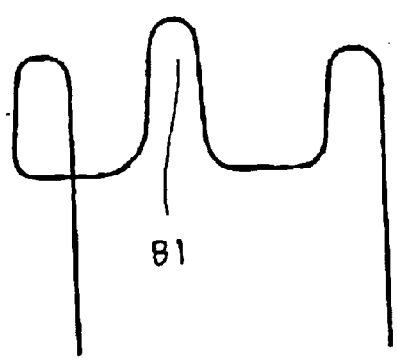
Figure 19:
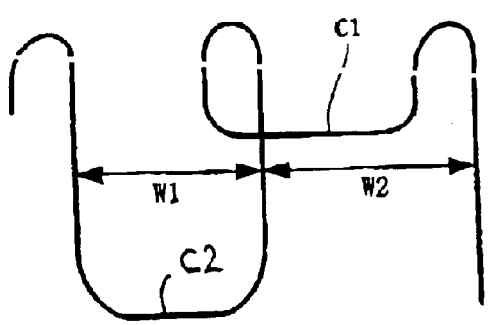
Figure 19:
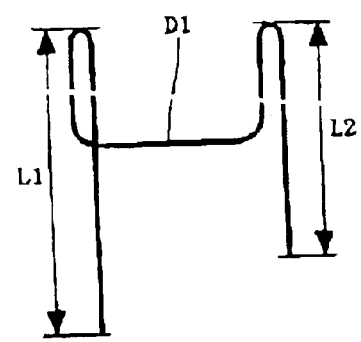
Figure 19:
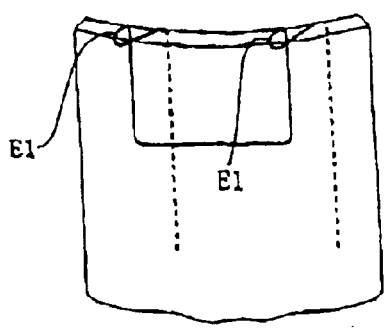
Figure 19:
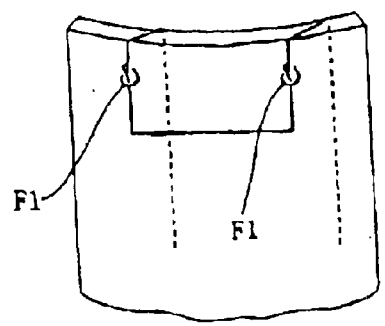
Figure 20:
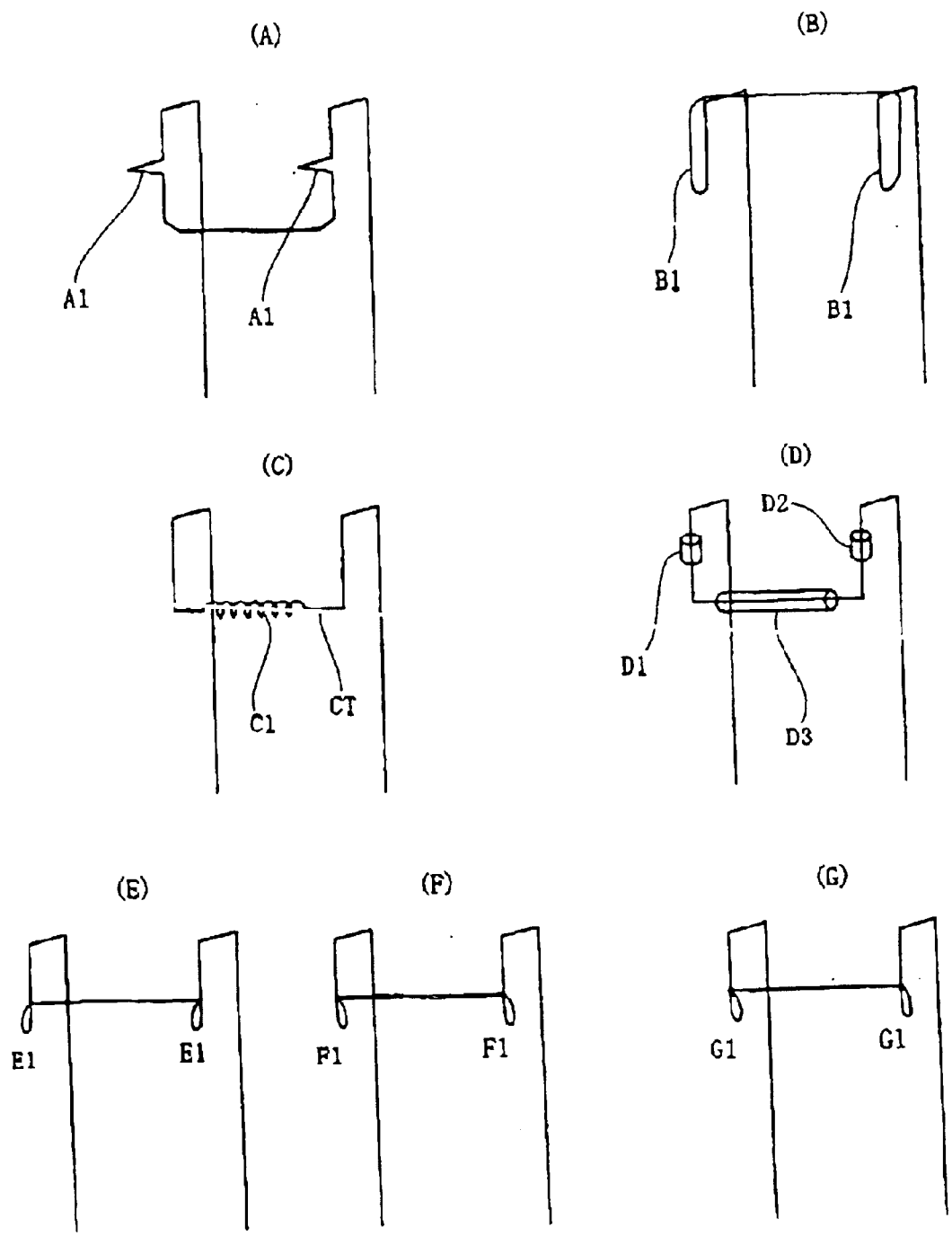
FIGS. 20(A), (B), (C), (D), (E), (F), and (G) show further examples of fine members.
Figure 21:
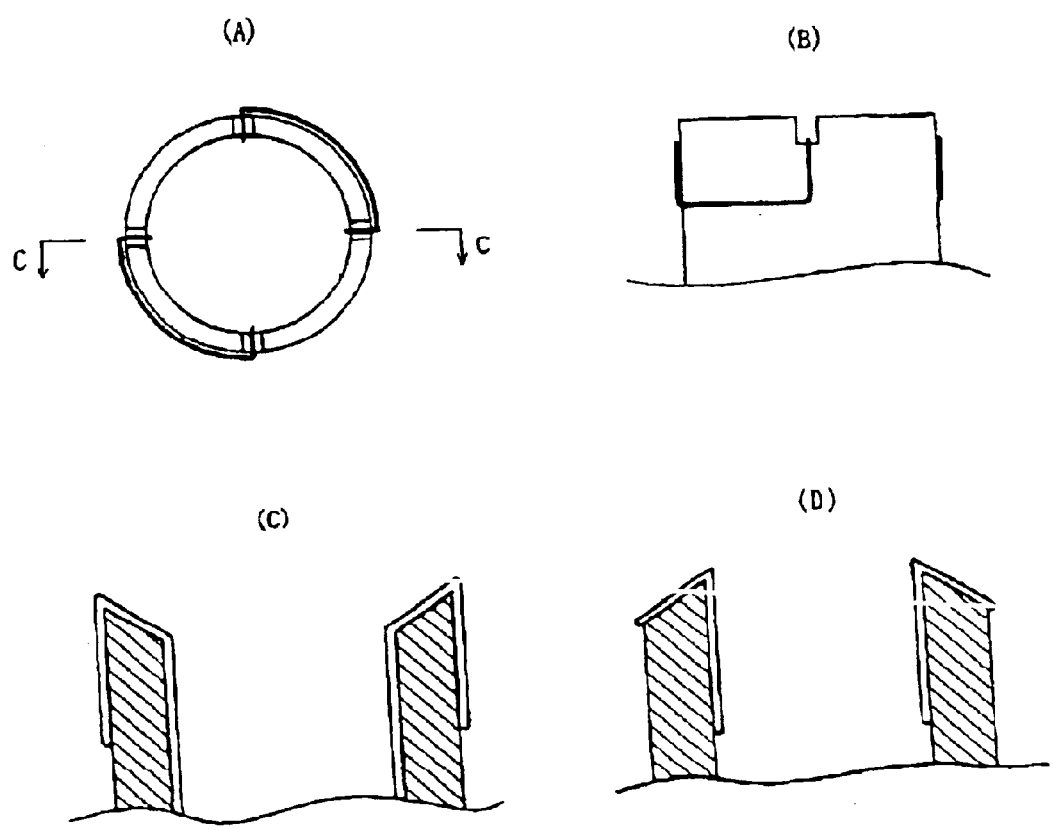
FIGS. 21(A), (B), (C), and (D) show the relationship between the fine members and the end face of the tube.

FIG. 19 through FIG. 21 show examples of pull-in prevention means provided for the coupling portions. FIG. 19(A) shows a catch portion A1 and FIG. 19(B) shows a loose portion B1. In FIGS. 19(C) and (D), connections C1, C2, D1 each prevent this phenomenon. In FIGS. 19(E) and (F), loops E1 and knots F1, respectively, are shown. As shown in FIG. 19(D), the lengths of fine members may be different from each other in order to impart anisotropy, in which overlapping portions of the fitted tubes are resistant to bending along the direction of long fine member L1, but tend to bend along the direction of short fine member L2. In the alternative, interspaces between adjacent fine members may be different from each other, as shown in FIG. 19(C), in order to impart anisotropy, in which overlapping portions of the fitted tubes are resistant to bending along the direction of the narrowly spaced fine members, but tend to bend along the direction of the widely spaced fine members.

FIG. 20 shows additional examples of pull-in prevention means. In FIGS. 20(A) and (B), projecting portions A1 and looped portions B1, respectively, are shown. In FIG. 20(C), connection CT includes spiral portion C1. In FIG. 20(D), other members D1, D2, D3 are threaded on fine members. FIGS. 20(E) and (F) respectively show loops E1, F1. In FIG. 20(G), loops G1 are welded.

With reference to FIG. 21, an end face of an outer tube is processed to form a pull-in prevention means. As shown in FIGS. 21(A) and (B), grooves for respectively receiving the fine members are formed in the end face of the outer tube in order to prevent the coupling portions from being pulled into the outer tube. Referring to FIG. 21(C), the bottom of each groove is inwardly inclined and the outer edge of the outer tube defines an acute angle. This feature also prevents the coupling portions from being pulled into the outer tube. Accordingly, an acute angle formed between the end face of the outer tube and the side thereof (or an acute angle formed between the end face of a cylindrical inner tube and the side thereof) provided the pull-in prevention effect. In addition, as shown in FIG. 21(D), this feature eliminates the need for a connection on the outer face of the outer tube (or on the inner face of the inner tube). FIG. 21(D) shows acute inner edges of the outer tube, which are examples of pull-in prevention means.

While the preferred embodiments of the present invention have been described, such description is for illustrative purposes only, and it is to be understood that changes and variations may be made without departing from the spirit or scope of the accompanying claims. The following is one preferred modification. Fine members may extend along the length of the overlapping portions of the fitted inner and outer tubes, thereby making the energy absorption performance substantially uniform. Angular cross-sectional fine members tend to cause stress concentration and introduce plastic deformation. Accordingly, the dimensional tolerances of the components are absorbed and energy absorbing performance is made uniform. Hollow fine members also tend to cause plastic deformation. Accordingly, adverse effects of the dimensional tolerances of the components are reduced. In addition, by modifying the circumferential interspaces between adjacent fine members, rigidity can be modified as desired. Thus, axial rigidity can be adjusted. Further, even if, e.g., a weld bead remains on a circular outer tube, the fine members can be disposed so as to avoid the weld bead. This feature facilitates simple post-processing of weld beads.

Lubricant can be applied to the fine members or either one of the tubes to prevent the fine members from being pulled off when one tube is pressed into the other tube.

The above described three representative embodiments provide examples of the use of the present teachings at a position between an outer tube and an inner tube. However, the present teachings can be utilized at a position between an outer shaft and an inner shaft, in which case the inner shaft may be solid or cylindrical. The present invention can also be utilized at a position between a steering tube and a bracket, which includes a cylindrical member used to attach the steering tube to a vehicle body.

The invention of claim 1 enables the production of steering devices in which a relatively low-cost, circular cross-sectional inner shaft member is connected to a relatively low-cost, circular cross-sectional outer tube member less rigidly to a proper degree in the axial direction and rigidly in the rotating direction. Thus, energy absorbing type steering devices can be manufactured at relatively low cost. In addition, a batch of energy absorption type steering devices can provide uniform energy absorption performance. By changing the number, the quality, the thickness, etc., of the fine members, various types of energy absorption performance can be provided.

The improvements according to claims 2 through 7 enable uniform energy absorption performance for a batch of energy absorbing type steering devices.

The assembling method according to claim 8 enables reliable assembly of a batch of steering devices having uniform energy absorption performance.

The improvements according to claims 9 to 11 further enable uniform energy absorption performance for a batch of energy absorbing type steering shafts.

The assembling apparatus according to claim 12 enables highly efficient assembly of a batch of steering devices having uniform energy absorption performance.

What is claimed is:

1. An energy absorbing steering device comprising:
   an inner shaft member having an outer surface that is circular in cross-section,
   an outer cylindrical member press-fitted around the inner shaft member, the outer cylindrical member having an inner surface that is circular in cross section and the diameter of the inner surface of the outer cylindrical member is larger than the diameter of the outer surface of the inner shaft member, and
   a plurality of fine members interleaved between the outer cylindrical member and the inner shaft member, each fine member interleaved between the outer cylindrical member and the inner shaft member extending along a straight line without being bent along the overlap between the inner shaft member and the outer cylinder member.

2. An apparatus as in claim 1, wherein the fine members have a Vickers hardness and either (1) the inner shaft member has a Vickers hardness that differs by at least 200 from the Vickers hardness of the fine members or (2) the outer cylindrical member has a Vickers hardness that differs by at least 200 from the Vickers hardness of the fine members.

3. An apparatus as in claim 1, wherein the plurality of fine members are arranged to require a pre-determined pressing load in order for the outer cylindrical member to axially displace relative to the inner shaft member.

4. An apparatus as in claim 1, wherein an axially extending clearance is defined between the inner shaft member and the outer cylindrical member and proximal to each fine member extending along the straight line without being bent.

5. An apparatus as in claim 1, wherein the length of the fine members along the axial direction is longer than or equal to a predetermined length that ensures a clearance between the inner shaft member and the outer cylindrical member when the inner shaft member and the outer cylindrical member absorb energy and become more deeply fitted.

6. An apparatus as in claim 1, further comprising means for preventing movement of the fine members in the axial direction.

7. An apparatus as in claim 1, wherein the fine members further comprise a coupling portion that fixedly couples the fine members to an end face of the inner shaft member or to an end face of the outer cylindrical member.

8. An apparatus as in claim 7, further comprising means for preventing the coupling portions of the fine members from dislodging from the end face of the inner shaft member or the end face of the outer cylindrical member.

9. An apparatus as in claim 8, wherein the fine members have a Vickers hardness and either (1) the inner shaft member has a Vickers hardness that differs by at least 200 from the Vickers hardness of the fine members or (2) the outer cylindrical member has a Vickers hardness that differs by at least 200 from the Vickers hardness of the fine members.

10. An apparatus as in claim 9, wherein the length of the fine members along the axial direction is longer than or equal to a predetermined length that ensures a clearance between the inner shaft member and the outer cylindrical member when the inner shaft member and the outer cylindrical member absorb energy and become more deeply fitted.

11. An apparatus as in claim 1, wherein the inner shaft member is an inner tube or an inner shaft and the outer cylindrical member is an outer tube or an outer cylinder.

12. An apparatus as in claim 1, wherein the movement of the fine members in the axial direction is prohibited with respect to one of the inner shaft member and outer cylindrical member and is allowed with respect to the other of the inner shaft member and outer cylindrical member.

13. An apparatus as in claim 1, wherein the cross section of each fine member is circular.

14. An apparatus as in claim 1, wherein each fine member is made of steel wire.

15. An apparatus as in claim 1, wherein each fine member is made of steel wire having a property that the rigidity is increased when bent.

16. A method for assembling an energy absorbing steering device comprising:
  extending a plurality of fine members along the axial direction of an outer surface of an inner shaft member or an inner surface of an outer cylindrical member, each fine member extending along a straight line without being bent, and
  press-fitting the outer cylindrical member around the inner shaft member, wherein the fine members are disposed within a clearance defined between the inner shaft member and the outer cylindrical member at least along the length of the fine members that are interleaved between the inner shaft member and the outer cylindrical member, each fine member interleaved between the inner shaft member and the outer cylindrical member extending along the straight line without being bent along the overlap between the inner shaft member and the outer cylinder member.

17. A method as in claim 16, wherein during the press-fitting step, at least one of the inner shaft member, the outer cylindrical member, or the fine members is deformed beyond an elastic limit thereof.

18. A method as in claim 16, further comprising during the press-fitting step:
  measuring the pressing load being applied, and
  cutting the fine members when the measured pressing load reaches a predetermined value.

19. A method as in claim 18, wherein during the press-fitting step, at least one of the inner shaft member, the outer cylindrical member, or the fine members is deformed beyond an elastic limit thereof.

20. A method as in claim 16, wherein a predetermined length of the plurality of fine members is extended along the axial direction of the inner shape of the outer cylindrical member, and the inner shaft member is press-fitted while preventing the fine members from being axially pulled further into the outer cylindrical member.

21. A method as in claim 20, wherein during the press-fitting step, at least one of the inner shaft member, the outer cylindrical member, or the fine members is deformed beyond an elastic limit thereof.

22. An apparatus for assembling an energy absorbing steering device comprising:
  means for extending a plurality of fine members along the axial direction of an outer surface of an inner shaft member or an inner surface of an outer cylindrical member, each fine member extending along a straight line without being bent, and means for pressing-fitting the outer cylindrical member around the inner shaft member, wherein the fine members are disposed within a clearance defined between the inner shaft member and the outer cylindrical member at least along the length of the fine members that are interleaved between the inner shaft member and the outer cylindrical member, each fine member interleaved between the inner shaft member and the outer cylindrical member extending along the straight line without being bent alone the overlap between the inner shaft member and the outer cylinder member.

23. An apparatus as in claim 22, further comprising means for deforming at least one of the inner shaft member, the outer cylindrical member, or the fine members beyond an elastic limit thereof.

24. An apparatus as in claim 22, further comprising:
  means for measuring the pressing load being applied by the pressing means, and
  means for cutting the fine members when the measured pressing load reaches a predetermined value.

25. An apparatus as in claim 22, wherein extending means extends a predetermined length of the plurality of fine members along the axial direction of the inner shape of the outer cylindrical member, and press-fitting means prevents the fine members from being axially pulled further into the outer cylindrical member.

26. An apparatus as in claim 22, further comprising a drum for winding said fine members, wherein the wound fine member is pulled from the drum while press-fitting the inner shaft member into the outer cylindrical member.

* * * * *